United States Patent [19]

Sato et al.

[11] 4,450,682
[45] May 29, 1984

[54] CARBON PARTICULATES CLEANING DEVICE FOR DIESEL ENGINE

[75] Inventors: Susumu Sato, Okazaki; Yukihisa Takeuchi, Aichi; Masahiro Tomita, Anjo; Shigeru Kamiya, Chiryu; Shigeru Takagi, Anjo, all of Japan

[73] Assignee: Nippon Soken, Inc., Nishio, Japan

[21] Appl. No.: 525,527

[22] Filed: Aug. 22, 1983

Related U.S. Application Data

[63] Continuation of Ser. No. 480,379, Apr. 5, 1983, abandoned, which is a continuation of Ser. No. 235,722, Apr. 18, 1981, abandoned.

[30] Foreign Application Priority Data

Feb. 18, 1980 [JP] Japan .................... 55-18891
Feb. 25, 1980 [JP] Japan .................... 55-22363

[51] Int. Cl.$^3$ ............................................. F01N 3/02
[52] U.S. Cl. ....................................... 60/286; 55/283; 55/482; 55/488; 55/523; 55/DIG. 10; 55/DIG. 30; 60/303; 60/311
[58] Field of Search ............ 60/286, 303, 299, 311; 55/DIG. 10, DIG. 30, 282, 283, 482, 488, 523

[56] References Cited

U.S. PATENT DOCUMENTS

| | | | |
|---|---|---|---|
| 3,445,196 | 5/1969 | Thomas | 55/DIG. 30 |
| 3,470,689 | 10/1969 | Gurr | 55/DIG. 30 |
| 3,503,716 | 3/1970 | Berger | 60/297 |
| 3,892,536 | 7/1975 | Roeser | 422/169 |
| 4,054,418 | 10/1977 | Miller | 60/303 |
| 4,211,075 | 7/1980 | Ludecke | 60/311 |
| 4,264,346 | 4/1981 | Mann | 55/523 |
| 4,281,512 | 8/1981 | Mills | 60/311 |
| 4,319,896 | 3/1982 | Sweeney | 60/311 |

Primary Examiner—Douglas Hart
Attorney, Agent, or Firm—Cushman, Darby & Cushman

[57] ABSTRACT

A carbon particulates cleaning device for use in a diesel engine of an automobile or the like comprises an exhaust gas main pipe, an exhaust gas branch pipe diverged from the exhaust main pipe, a carbon particulates catching member which is provided within at least one of the exhaust gas main pipe and the exhaust gas branch pipe, a valve means by which exhaust gas is selectively supplied into the exhaust gas main pipe or the exhaust gas branch pipe, a heating means which heats the carbon particulates catching member, a gas supplying means which supplies gas into the carbon particulates catching member when the carbon particulates catching member is heated and a control means which controls each operation of the valve means, the heating means and the gas supplying means. When the carbon particulates caught by the carbon particulates catching member reaches a predetermined volume, a control means operates to stop the exhaust gas from flowing into the carbon particulates catching member, the upper stream portion of the carbon particulates catching member is heated over the burning temperature of carbon particulates by the heating means and gas such as air is supplied from the gas supplying means into the carbon particulates catching member to transmit the heat of the upper stream portion of the carbon particulates catching member into the downstream portion thereof. As a result, the carbon particulates catching member is effectively heated by a small amount of heat energy and the carbon particulates caught by the carbon particulates catching member are burnt and eliminated.

11 Claims, 6 Drawing Figures

CARBON PARTICULATES CLEANING DEVICE FOR DIESEL ENGINE

This is a continuation of application Ser. No. 480,379 filed Apr. 5, 1983, abandoned upon the filing hereof, which in turn was a continuation of Ser. No. 235,722 filed Apr. 18, 1981, now abandoned.

BACKGROUND OF THE PRESENT INVENTION

The present invention relates to a carbon particulates cleaning device for eliminating particulates mainly composed of carbon which are contained in an exhaust gas discharged from a diesel engine, particularly to a carbon particulates cleaning device provided with a carbon particulates catching means composed of a filter member and a heating means for burning the carbon particulates caught by the carbon particulates catching means in an exhaust gas passage of the diesel engine.

In one example of the conventional carbon particulates cleaning device, a filter member is provided in the exhaust gas passage for catching particulates mainly composed of carbon (hereinafter called carbon particulates) and the caught carbon particulates are burnt due to heat of an exhaust gas.

However, the above described device has a problem that the filter member is apt to be clogged by carbon particulates. Namely, the temperature of the exhaust gas hardly rises over the temperature required for burning the carbon (about 600° C.) when the vehicle runs on a street of a town. As a result, the carbon particulates caught by the filter member are not sufficiently burnt so that the filter member is clogged by the unburnt carbon particulates.

In order to prevent the filter member from being clogged by the carbon particulates, one device has been proposed. In the proposed device, heating means is provided adjacent to the filter member on the upper stream side thereof for burning caught carbon particulates when the caught volume thereof is increased.

The above described device has a problem that since plenty of exhaust gas of which temperature is lower than the burning temperature of the carbon particulates, flows through the filter member when the filter member is heated by the heating means, the caught carbon particulates are not effectively heated by the heating means. Furthermore, when the filter member is made of heat resistant material such as foamed ceramic, the upper stream side of the filter member is rapidly heated up to the burning temperature of the carbon particulates, but a large amount of heat energy is required to heat the downstream side of the filter member up to such a burning temperature as described above.

Another problem of the proposed device is that a steep temperature slope is formed between the upper stream side of the filter member and the downstream side thereof when the upper stream side of the filter member is heated by the heating means.

Consequently, when the filter member made of fragile material such as foamed ceramic is used, the filter member is easy to be cracked due to distortion caused by the above described heat slope.

Accordingly, one object of the present invention is to provide a carbon particulates cleaning device which enables the carbon particulates caught by the filter member to be effectively burnt by rapidly heating the whole filter member by a small amount of heat energy.

Another object of the present invention is to provide a carbon particulates cleaning device provided with a filter member, which has such excellent durability as to be not damaged due to the steep temperature slope.

DESCRIPTION OF THE DRAWINGS

Other objects and advantages of the invention will become apparent from the following description of embodiments with reference to the accompanying drawings wherein.

SUMMARY OF THE INVENTION

A carbon particulates cleaning device of the present invention comprises an exhaust gas passage formed by an exhaust gas main pipe and an exhaust gas branch pipe, a carbon particulates catching member which is provided within at least one of the exhaust gas main pipe and the exhaust gas branch pipe, a valve means by which exhaust gas is selectively supplied into the exhaust gas main pipe or the exhaust gas branch pipe, a heating means which heats the carbon particulates catching member, a gas supplying means which supplies gas into the carbon particulates catching member when the carbon particulates catching member is heated and a control means which controls each operation of the valve means, the heating means and the gas supplying means.

When the volume of the carbon particulates caught by the carbon particulates catching member reaches a predetermined volume, the exhaust gas is stopped from flowing into the carbon particulates, one portion of the carbon particulates catching member is heated up over the burning temperature of the carbon particulates by the heating means and the heat generated in this portion of the carbon particulates catching member is transmitted to the whole carbon particulates catching member by the gas supplied from the gas supplying means.

Since one portion of the carbon particulates catching member is heated when the exhaust gas of which temperature is lower than the burning temperature of carbon particulates does not flow therethrough, the temperature of this portion of the carbon particulates catching member rapidly rises and the transmission of the heat is promoted by the supplied gas.

Therefore, the whole carbon particulates catching member is effectively heated by a small amount of heat so that the carbon particulates caught by the carbon particulates catching member are completely burnt.

DETAILED DESCRIPTION OF THE PRESENT INVENTION

Figure 1:
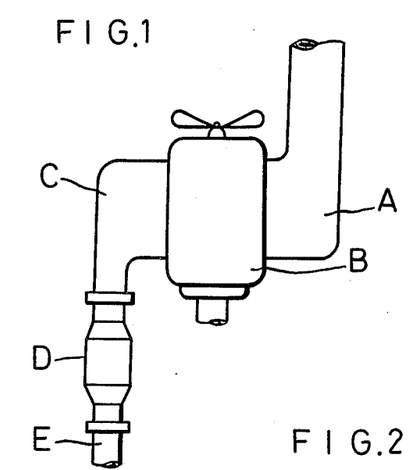
FIG. 1 is a view showing one example of the attaching position of a carbon particulates cleaning device of the present invention.

A carbon particulates cleaning device D is interposed between an exhaust manifold C and an exhaust pipe E. The carbon particulates cleaning device D catches and cleans carbon particulates contained within the exhaust gas which is discharged from a diesel engine B. Reference character A designates an intake manifold.

Hereinafter, several embodiments of the carbon particulates cleaning device D will be explained.

Figure 2:
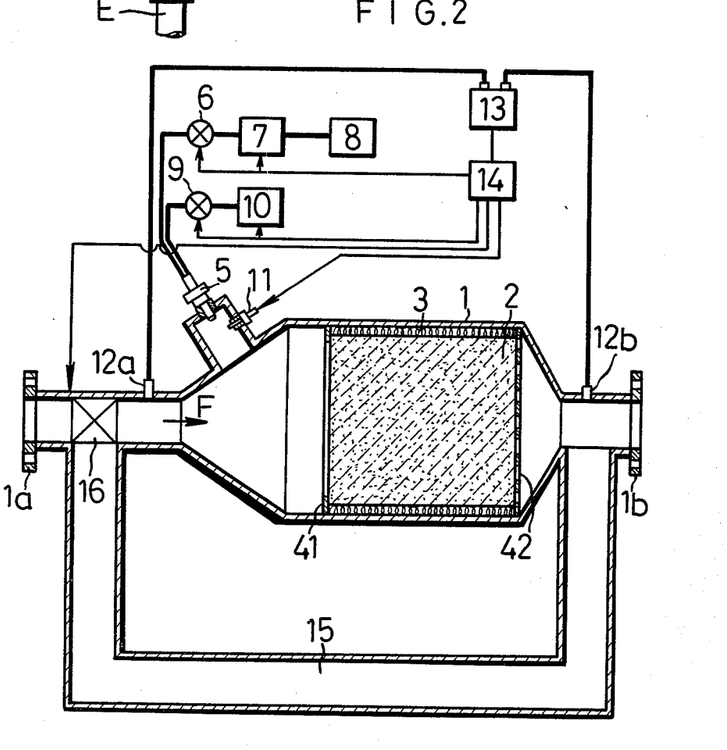
FIG. 2 is a view showing a longitudinal section of a first embodiment of the present invention and piping and wiring thereof.

FIG. 2 shows a first embodiment of the present invention.

A casing 1 is a cylindrical body made of stainless steel. Both ends of the casing 1 are formed into flange portions 1a and 1b which are connected to the exhaust manifold C and the exhaust pipe E respectively.

The exhaust gas flows along the arrow F. Within the casing 1, a filter member 2 which operates as a carbon particulates catching member, is disposed. The filter member 2 is made of foamed cordierite ceramic and is elestically supported by a wire net 3 made of stainless steel which is interposed between the outer wall of the filter member and the inner wall of the casing 1, in the radial direction thereof. And the filter member 2 is also fixed in the axial direction thereof by means of a ring stay 41 and a punching metal 42 which are welded to the inner wall of the casing 1 respectively.

The casing 1 is provided with an exhaust gas branch passage 15 for bypassing exhaust gas, between the upper stream side of the filter member 2 and the downstream side thereof. An electromagnetic valve 16 is provided in the diverging point of the casing 1 on the upper stream side of the filter member 2 for selectively supplying the exhaust gas into the filter member 2 or the exhaust gas branch passage 15.

An oil burner 5 is provided in the casing 1 on the upper stream side of the filter member 2. The oil burner 5 is connected to a fuel tank 8 by way of a fuel pipe through an electromagnetic valve 6 and a fuel pump 7 and is also connected to an air pump 10 by way of a blast pipe through an electromagnetic valve 9.

In front of the oil burner 5, a glow plug 11 is provided for igniting the air-fuel mixture injected from the oil burner 5.

Pressure taps 12a and 12b are provided in the casing 1 on the upper stream side and the downstream side of the filter member 2 respectively. These pressure taps 12a and 12b are connected to a differential pressure detector 13 by way of pipes respectively.

When the differential pressure between the upper stream side and the downstream side of the filter member 2 is increased according as the increment of the volume of the carbon particulates caught by the filter member 2, the volume of the caught carbon particulates can be indirectly detected by the differential pressure detector 13.

The differential pressure detector 13 is electrically connected to the electromagnetic valve 6 and the fuel pump 7 of the fuel supply means, the electromagnetic valve 9 and the air pump 10 of the gas supply means, the glow plug 11 and the electromagnetic valve 16 which is provided in the branching portion of the casing 1, through a control circuit 14. The control circuit 14 operates the fuel supply means, the gas supply means, the glow plug 11 and the electromagnetic valve 16 upon receiving electrical signals from the differential pressure detector 13.

The control circuit 14 is provided with a timer (not shown) therein. The operating time of the gas supply means and the electromagnetic valve 16 is set longer than that of the fuel supply means and the glow plug 11.

Hereinafter, the operation of the above described embodiment will be explained.

The exhaust gas containing carbon particulates is introduced into the cleaning device D from the engine B through the exhaust manifold C. At this time, the electromagnetic valve 16 which is provided in the diverging portion of the casing 1 opens the passage leading to the filter member 2, and closes the exhaust gas branch passage 15.

The carbon particulates contained within the exhaust gas which is introduced within the casing 1 are caught by the filter member 2 and cleaned exhaust gas is discharged into the exhaust pipe E. As the volume of the carbon particulates caught by the filter member 2 is gradually increased, the differential pressure between the upper stream side of the filter member 2 and the downstream side thereof is increased. When the differential pressure reaches a predetermined value, the differential pressure detector 13 generates electrical signals to operate the control circuit 14. Then, electric current is supplied to the electromagnetic valve 16, the glow plug 11, the fuel pump 7, the air pump 10, and the electromagnetic valves 6 and 9.

Upon receiving electric current, the electromagnetic valve 16 operates to change the exhaust gas passage into the exhaust gas branch passage 15.

And the fuel pump 7 and the air pump 10 operate and the electromagnetic valves 6 and 9 open. The air-fuel mixture injecting from the oil burner 5 is ignited by the glow plug 11 to generate burner flame. Then, the upper stream side of the filter member 2 is heated. As a result, the temperature of the end surface of the filter member 2 is increased up to about 1000° C. The carbon particulates caught by the upper stream side of the filter member 2 are burnt.

After a predetermined time is passed, the timer of the control circuit 14 operates to stop electric current from being supplied into the fuel pump 7, the electromagnetic valve 6 and the glow plug 11. Consequently, the upper stream side of the filter member 2 is stopped from being heated. But, air is continuously supplied from the gas supply means within the casing 1.

Figure 3:
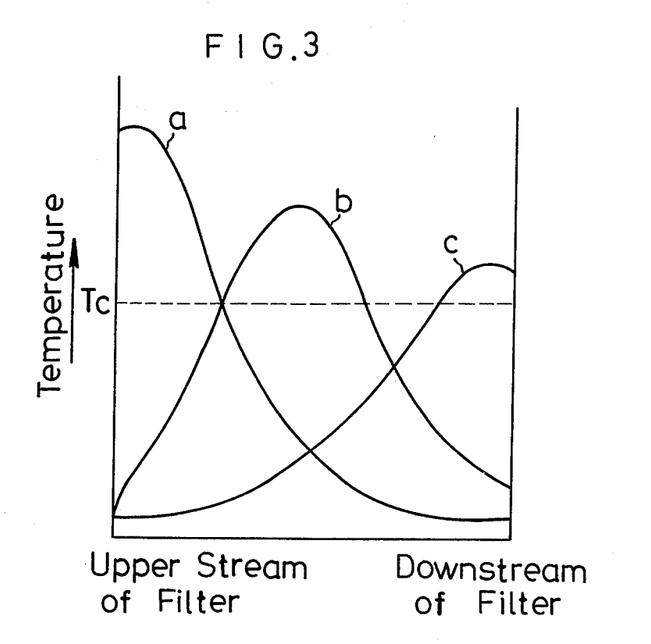
FIG. 3 is a view showing temperature distribution in the filter member.

At this time, the temperature of the inside of the filter member 2 is high (about 1000° C.) on the upper stream side thereof as shown by a line a in FIG. 3, and the downstream side of the filter member 2 is scarcely heated. In FIG. 3, Tc designates the burning temperature of carbon.

Since air is continuously supplied to the filter member 2 after the operation of the glow plug 11 is stopped, the heat stored in the upper stream side of the filter member 2 is transmitted into the supplied air. The air to which the heat is transmitted flows through the filter member 2 so that the heat is gradually transmitted into the downstream side of the filter member 2. As a result, the temperature distribution of the filter member 2 is changed from the line b into the line c of FIG. 3. And the carbon particulates caught by the downstream side of the filter member 2 can be also burnt.

Thus the carbon particulates caught by the filter member 2 are burnt from the upper stream side into the downstream side thereof completely.

The time which is required to increase the temperature of the downstream side of the filter member 2 over Tc can be determined by the material, size and flowing volume of the filter member 2, the energy volume of the burner 5 and the like.

By setting the timer of the control circuit 14 into the above described time, electric current is stopped from flowing into the air pump 10 and the electromagnetic valve 9 of the air supply means and the electromagnetic valve 16 after the carbon particulates caught by the filter member 2 are completely burnt.

Then, the air is stopped from being supplied into the casing 1 and the passage of the exhaust gas is changed into that leading to the filter member 2 from the exhaust gas branch passage 15.

According to the exhaust gas cleaning device of the first embodiment, the heating efficiency of the filter member 2 can be made good.

Namely, the temperature of the exhaust gas is lower than the burning temperature of carbon (about 600° C.) at a normally driving time. If the exhaust gas flows into the casing 1, the heating efficiency is lowered.

In contrast, according to the exhaust gas cleaning device of the first embodiment, since the exhaust gas flows into the exhaust gas branch passage 15 when the filter member is heated, the filter member 2 can be effectively heated up to a desired temperature for a short period of time by a small amount of fuel without being cooled by the exhaust gas of which temperature is low.

Furthermore, according to the first embodiment, only the upper stream side of the filter member 2 is heated up to a desired temperature, and then the heat of the upper stream side of the filter member 2 is transmitted into the downstream side thereof by continuously supplying only the air into the filter member 2. Therefore, the amount of heat required to heat the filter member can be made smaller and the consumption of fuel and electric power can be largely decreased.

And according to the device of the first embodiment, the carbon particulates caught by the filter member 2 are intermittently burnt and cleaned so that the filter member 2 is prevented from being clogged by the carbon particulates.

Figure 4:
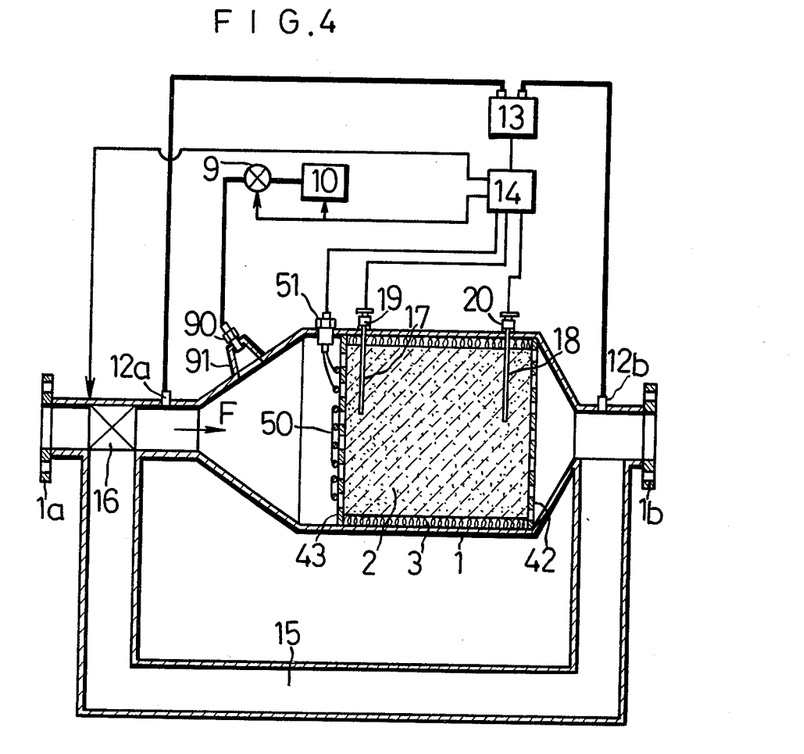
FIG. 4 is a view showing a longitudinal section of a second embodiment of the present invention and piping and wiring thereof.

FIG. 4 shows a second embodiment of the present invention. The second embodiment will be explained based on the different points from the first embodiment.

A heater 50 made of resistance wire is used in place of the glow plug 11 of the first embodiment. The heater 50 called a sheath heater is provided with a heating portion made of nichrome wire, which is covered by a stainless steel pipe through an insulating pulverulent body made of magnesia.

The heater 50 is provided on the upper stream side of the filter member 2 by spot-welding the stainless steel pipe of the heater 50 to the punching metal 43 which is provided on the upper stream side of the filter member 2. Both ends of the heater 50 are connected to the control circuit 14 through a terminal 51 which is secured to the casing 1. A tap 90 is screwed in a horn-shaped stay 91 provided on the upper stream side of the filter member 2 and is connected to the air pump 10 by a blast pipe through the electromagnetic valve 9.

Within the filter member 2, alumel-chromel thermocouples 17 and 18 are provided on the upper stream side and the downstream side of the filter member 2 respectively. The thermocouples 17 and 18 are secured to the casing 1 by means of stays 19 and 20 and are connected to the control circuit 14.

Other construction of the second embodiment is substantially equal to that of the first embodiment.

In the exhaust gas cleaning device of the second embodiment, since electric current is supplied into the heater 50 while the exhaust gas is bypassed through the exhaust gas branch passage 15, the upper stream side of the filter member 2 is heated up to a desired temperature rapidly. Then, the thermocouple 19 generates electrical signals. And the control circuit 14 operates to stop electric current from being supplied into the heater 50 upon receiving the electrical signals from the thermocouple 19. And the air pump 10 and the electromagnetic valve 9 operate to start to supply air into the casing 1.

And when the temperature of the filter member 2 on the downstream side thereof reaches a predetermined temperature over the burning temperature of carbon, the thermocouple 18 generates electrical signals to operate the control circuit 14.

Then, the air is stopped from being supplied into the casing 1 and the electromagnetic valve 16 which is provided in the branch portion operates so that the exhaust gas starts to flow into the casing 1 again.

And the exhaust gas cleaning device of the second embodiment has effect substantially equal to that of the first embodiment.

In the first and the second embodiments, the filter member, the heating means and the air supply means are provided in the casing 1.

In addition, such means as described above can be provided in the exhaust gas branch passage 15 as well as the casing 1.

In the first and the second embodiments, uncleaned exhaust gas is discharged from the exhaust gas branch pipe for a short time while the exhaust gas flowing into the casing 1 is cleaned.

By providing such an exhaust gas cleaning device as described in the first and second embodiments in both diverged exhaust passages so as to operate alternately, the uncleaned exhaust gas can be prevented from being discharged from both diverged exhaust passages.

And other filter member made of heat resistant material than that made of ceramic foamed body can be also used.

And in the first and the second embodiments, the flowing operation is done by air. One portion of the exhaust gas can be used in place of the air.

Figure 5:
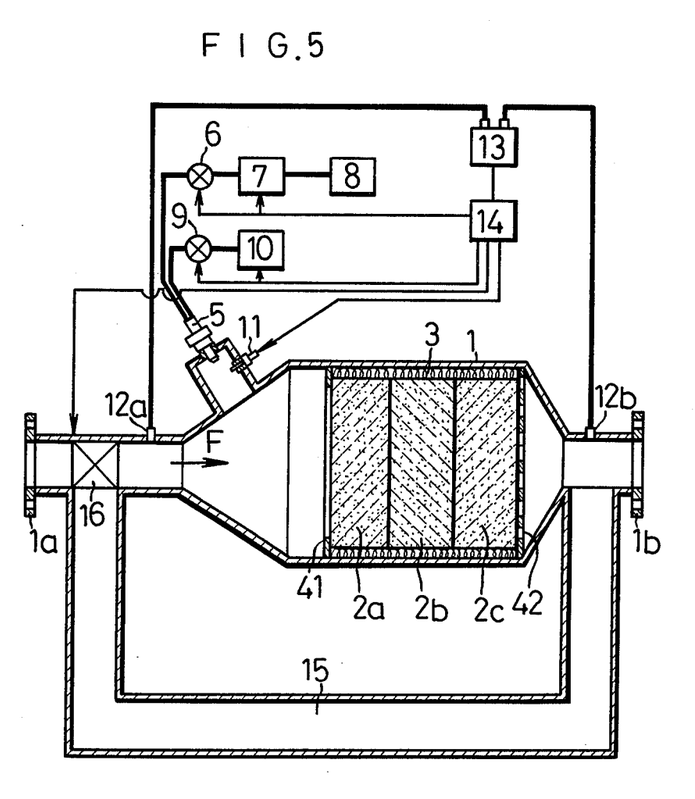
FIG. 5 is a view showing a longitudinal section of a third embodiment of the present invention and piping and wiring thereof.

FIG. 5 shows a third embodiment of the present invention.

A filter member 2 made of cordierite ceramic foamed body is composed of three split members 2a, 2b and 2c having the same shape and the same size as each other.

And the split members are arranged in the exhaust gas flowing direction and are accomodated within the casing 1 so that the opposed end surfaces of each split member are closely contacted with each other.

Other construction of the third embodiment is substantially equal to that of the first embodiment.

When the end surface of the split member 2a of the third embodiment is heated by the oil burner 5 up to about 1000° C., within the filter member 2 composed of the split members 2a, 2b and 2c, such a steep temperature slope as shown by the line a of FIG. 3 is generated. But, the temperature difference between the upper stream side of each split member 2a, 2b or 2c and the downstream side thereof is comparatively small. Therefore, each split member is not cracked nor damaged due to heat distortion and the durability of the whole filter member 2 is increased.

Figure 6:
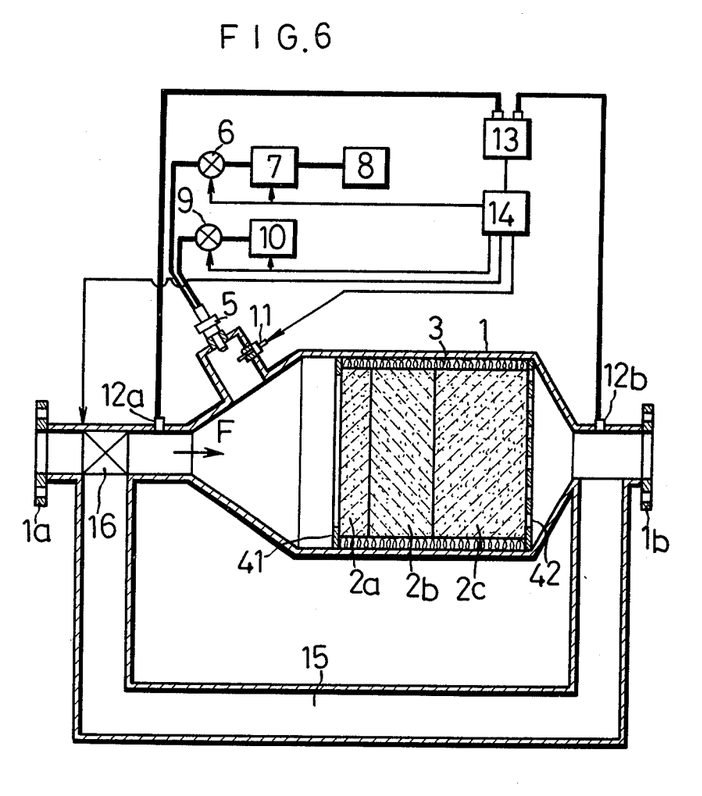
FIG. 6 is a view showing a longitudinal section of a fourth embodiment of the present invention and piping and wiring thereof.

FIG. 6 shows a fourth embodiment. Each length of the split members 2a, 2b and 2c which are arranged along the exhaust gas flowing direction has a relation of $2a < 2b < 2c$.

Other construction of the fourth embodiment is substantially equal to that of the third embodiment.

As shown in FIG. 3, the temperature slope of the filter member 2 on the upper stream side thereof (the split member 2a) is specially steeper than that of the other portion when the filter member 2 is heated. Therefore, by making the length of the split member positioned on the upper stream side shorter than that positioned on the downstream side, the temperature difference between the opposed end surfaces of the split member positioned on the upper stream side becomes more smaller than that of the split member of the third embodiment.

Therefore, each split member of the fourth embodiment has a higher strength against heat distortion compared with that of the third embodiment.

Furthermore, according to the fourth embodiment, the filter member can be effectively prevented from being cracked or damaged by using only a small number of split members.

Having now fully described the invention, it will be apparent to one of ordinary skill in the art that many changes and modifications can be made thereto without departing from the spirit or scope of the invention as set forth herein.

What is claimed is:

1. A carbon particulates cleaning device for cleaning the carbon particulates contained in the exhaust gas discharged from a diesel engine of an automobile or the like, comprising:

an exhaust gas passage adpated to be communicated with an exhaust manifold of a diesel engine;

said exhaust gas passage being formed by an exhaust gas main pipe and an exhaust gas branch pipe which is diverged from said exhaust gas main pipe;

a carbon particulates catching member which is provided within at least one of said exhaust gas main pipe and said exhaust gas branch pipe;

said carbon particulates catching member being composed of a plurality of ceramic foamed bodies which are arranged in the exhaust gas flowing direction so that opposed end surfaces of each ceramic foamed body are closely contacted with each other, the length of the upstream ceramic foamed body being shorter than that of the downstream ceramic foamed body;

a valve means which is provided in the portion where said exhaust gas branch pipe is diverged from said exhaust gas main pipe for selectively supplying said exhaust gas into said exhaust gas main pipe or said exhaust gas branch pipe;

a heating means which is provided adjacent to the upstream end of said carbon particulates catching member on the upstream side thereof for applying heat to said carbon particulates catching member so as to burn the carbon particulates caught by said carbon particulates catching member;

a gas supplying means which is provided in at least one of said exhaust gas main pipe and said exhaust gas branch pipe, adjacent to said heating means on the upstream side thereof for supplying gas into said carbon particulates catching member;

a carbon particulates volume detecting means which is provided in at least one of said exhaust gas main pipe and said exhaust gas branch pipe for detecting the volume of the carbon particulates caught by said carbon particulates catching member and which generates electrical signals when the volume of caught carbon particulates reaches a predetermined volume; and a control means which is electrically connected to said carbon particulates volume detecting means, said valve means, said heating means and said gas supplying means for supplying electrical signals to said valve means, said heating means and said gas supplying means upon receiving said electrical signals from said carbon particulates volume detecting means so as to start the operation of said valve means, said heating means and said gas supplying means;

whereby when the volume of the carbon particulates caught by said carbon particulates catching member reaches a predetermined volume, said valve means closes said exhaust gas passage leading to said carbon particulates catching member and opens another exhaust gas passage, said heating means applies heat to the upstream end of said carbon particulates catching means for a predetermined time and said gas supplying means supplies gas into said heating means until the carbon particulates caught by said carbon particulates catching member are burnt off.

2. A carbon particulates cleaning device according to claim 1, wherein:

said control means controls said gas supplying means and said heating means so that said gas supplying means finishes the operation thereof after said heating means finishes the operation thereof.

3. A carbon particulates cleaning device according to claim 1, wherein:

said gas supplying means comprises an air supplying passage, one end of which is communicated with an air source, the other end of which opens into said exhaust gas passage, and a valve means which opens and closes said air supplying passage, upon receiving electrical signals from said control means.

4. A carbon particulates cleaning device according to claim 1, wherein:

said gas supplying means comprises an exhaust gas supplying passage, one end of which is communicated with said exhaust manifold, the other end of which opens into said exhaust gas passage near said carbon particulates catching member, and a valve means which opens and closes said exhaust gas supplying passage, upon receiving electrical signals from said control means.

5. A carbon particulates cleaning device according to claim 1, wherein:

said heating means comprises a resistance wire heater which is disposed in an end surface of said carbon particulates catching member on the upstream side thereof and is electricaly connected to said control means.

6. A carbon particulates cleaning device according to claim 1, wherein:

said heating means comprises a fuel supplying means for supplying oil into said exhaust gas passage, an oil burner from which the mixture of said gas and said oil is injected into said exhaust gas passage and a glow plug for igniting said mixture injected from said oil burner, which is provided in at least one of said exhaust gas main pipe and said exhaust gas branch pipe, near said oil burner.

7. A carbon particulates cleaning device according to claim 1, wherein:
said valve means comprises an electromagnetic valve which operates upon receiving electrical signals from said control means.

8. A carbon particulates cleaning device according to claim 1, wherein:
said carbon particulates volume detecting means comprises a differential pressure detector which detects pressure defference between the upstream side of said carbon particulates catching member and the downstream side thereof and supplies electrical signal into said control means when said pressure difference reaches a predetermined value.

9. A carbon particulates cleaning device according to claim 1, further comprising:
two temperature detecting means provided in the upstream portion of said carbon particulates catching member and in the downstream portion thereof respectively;
said temperature detecting means being electrically connected to said control means.

10. A carbon particulates cleaning device according to claim 9, wherein:
said temperature detecting means comprises an alumel-chromel thermocouple.

11. A carbon particulates cleaning device according to claim 1, wherein:
said exhaust gas passage is formed by a casing which is adpated to be connected to the exhaust manifold;
said casing is composed of two pipe portions of which both ends are integrally joined with each other; and
one of said two pipe portions forms said exhaust gas main pipe and the other of said two pipe portions forms said exhaust gas branch pipe.

* * * * *